US012000556B2

(12) United States Patent
Gruendling

(10) Patent No.: US 12,000,556 B2
(45) Date of Patent: Jun. 4, 2024

(54) OPTICAL SYSTEM FOR AN AUTOMOTIVE HEADLAMP

(71) Applicant: ams-Osram AG, Premstätten (AT)

(72) Inventor: Vladimír Gruendling, Fürstenfeld (AT)

(73) Assignee: AMS-OSRAM AG, Premstaetten (AT)

( * ) Notice: Subject to any disclaimer, the term of this patent is extended or adjusted under 35 U.S.C. 154(b) by 0 days.

(21) Appl. No.: 18/254,923

(22) PCT Filed: Nov. 25, 2021

(86) PCT No.: PCT/EP2021/082993

§ 371 (c)(1),
(2) Date: May 30, 2023

(87) PCT Pub. No.: WO2022/117431

PCT Pub. Date: Jun. 9, 2022

(65) Prior Publication Data

US 2024/0027044 A1 Jan. 25, 2024

(30) Foreign Application Priority Data

Dec. 2, 2020 (DE) ..................... 10 2020 131 999.1

(51) Int. Cl.

*F21S 41/265* (2018.01)
*F21S 41/143* (2018.01)
*F21S 41/153* (2018.01)
*F21S 41/43* (2018.01)
*F21W 102/155* (2018.01)

(52) U.S. Cl.

CPC ........... *F21S 41/265* (2018.01); *F21S 41/143* (2018.01); *F21S 41/153* (2018.01); *F21S 41/43* (2018.01); *F21W 2102/155* (2018.01)

(58) Field of Classification Search

CPC ...... F21S 41/265; F21S 41/143; F21S 41/153; F21S 41/43

See application file for complete search history.

(56) References Cited

U.S. PATENT DOCUMENTS

2016/0230948 A1 8/2016 Kratochvil et al.
2018/0142854 A1 5/2018 Nakao et al.

FOREIGN PATENT DOCUMENTS

CN 208519679 U 2/2019
DE 10 2014 210 500 A1 12/2015
DE 10 2016 102 263 A1 8/2016

(Continued)

OTHER PUBLICATIONS

Panatsas, A. (Authorized Officer), International Search Report and Written Opinion dated Mar. 17, 2022, PCT Application No. PCT/EP2021/082993, 11 pages.

*Primary Examiner* — Elmito Breval

(74) *Attorney, Agent, or Firm* — MH2 TECHNOLOGY LAW GROUP LLP

(57) ABSTRACT

An optical system for use in a headlamp of a motor vehicle includes condenser optics formed by a condenser lens matrix and being provided to focus incoming light beams. It further includes at least one reflective shield being provided to reflect at least a subset of the focused light beams and to create a cut-off line of outgoing light beams. It further includes imaging optics formed by an imaging lens matrix, which is provided to project the focused light beams and the reflected light beams in front of the headlamp, such that the reflected light beams contribute to an intensity hotspot on one side of the cut-off line.

17 Claims, 4 Drawing Sheets

(56) References Cited

FOREIGN PATENT DOCUMENTS

| | | | |
|---|---|---|---|
| DE | 10 2015 224 305 | A1 | 6/2017 |
| DE | 11 2016 002 700 | T5 | 3/2018 |
| DE | 10 2018 220 514 | A1 | 5/2020 |
| EP | 2357399 | A1 | 8/2011 |
| JP | 2016-110818 | A | 6/2016 |

OPTICAL SYSTEM FOR AN AUTOMOTIVE HEADLAMP

CROSS-REFERENCE TO RELATED APPLICATIONS

The present application is the national stage entry of International Patent Application No. PCT/EP2021/082993, filed on Nov. 25, 2021, and published as WO 2022/117431 A1 on Jun. 9, 2022, which claims the benefit of priority of German Patent Application No. 10 2020 131 999.1, filed on Dec. 2, 2020, the disclosures of all of which are incorporated by reference herein in their entireties.

FIELD OF THE INVENTION

The present disclosure relates to an optical system for use in a headlamp of a motor vehicle.

BACKGROUND OF THE INVENTION

In the field of automotive lighting, in particular headlamp solutions, different approaches exist for optical systems enabling low and high beam functionality. Low beam mode is required to avoid blinding oncoming drivers. Reflector systems, which use one reflector or a set of reflectors, are simple solutions, which however have quite large dimensions and do not provide a sharp cut-off line. Projector systems can have a more compact design compared to the former approach. Typically, they use a single lens creating a sharp cut-off line. But this traditionally looking designs can still be optimized in terms of their size. For example, microlens arrays are very compact and have a minimal depth. An integrated chrome layer can create a cut-off line. The disadvantage of this approach is that it requires sophisticated and sensitive technology, leading to an expensive end product. Moreover, light is blocked by said chrome layer and can no longer be used for the main light beam.

It is an object to provide an optical system for automotive lighting that overcomes the above-mentioned drawbacks.

This objective is achieved by the subject-matter of the independent claim. Further developments and embodiments are described in the dependent claims.

SUMMARY OF THE INVENTION

In one embodiment, an optical system for use in a headlamp of a motor vehicle comprises condenser optics formed by a condenser lens matrix, which is provided to focus incoming light beams. The optical system further comprises at least one reflective shield being provided to reflect at least a subset of the focused light beams and to create a cut-off line of outgoing light beams. Furthermore, the optical system comprises imaging optics formed by an imaging lens matrix, which is provided to project the focused light beams and the reflected light beams in front of the headlamp such that the reflected light beams contribute to an intensity hotspot on one side of the cut-off line.

The condenser lens matrix may comprise only one single condenser lens, such that a 1×1 matrix is formed. However, in a preferred embodiment the condenser lens matrix comprises a plurality of condenser lenses. The condenser lenses are arranged in rows and/or columns. Each of the condenser lenses can focus the incoming light beams in a different way. For example, the condenser lenses can focus the incoming light beams in different focal points and/or focal lines. Thus, it is possible to design a light distribution according to the requirements of the road illumination. Light beams may also be called rays.

The at least one reflective shield may be arranged such that its main plane of extension is perpendicular or approximately perpendicular to the main plane of extension of the condenser lens matrix. However, different arrangements are likewise possible. In cases that more than one reflective shield is comprised by the optical system, the reflective shields can be arranged parallel to each other. The reflective shields can have different shapes. The at least one reflective shield may be attached to the condenser optics by an adhesive.

The at least one reflective shield is provided to create a cut-off line of outgoing light beams. The cut-off line may be a parallel or approximately parallel line with respect to the road's surface. The reflective shield reflects the subset of focused light beams which otherwise would be projected by the imaging optics beyond the cut-off line, i.e. on a side of the cut-off line which faces away from the road's surface. Light beams are reflected at a main surface of the reflective shield.

The imaging lens matrix may comprise only one single imaging lens, such that a 1×1 matrix is formed. However, in a preferred embodiment the imaging lens matrix comprises a plurality of imaging lenses. The imaging lenses of the imaging lens matrix are arranged in rows and/or columns. The outgoing light beams are superimposed by the imaging optics. This means that, if more than one imaging lens is comprised by the imaging lens matrix, each imaging lens provides an image, wherein the respective images are superimposed.

The imaging optics projects the focused and reflected light beams below said cut-off line, i.e. on the side of the cut-off line, which faces the road's surface. The intensity hotspot is created directly below the cut-off line, i.e. close to the cut-off line. The intensity hotspot is in particular generated by the reflected light beams, which are projected by the imaging optics. However, also light beams that are not reflected by the reflective shield may contribute to the intensity hotspot. The hot spot is a region within the distribution of outgoing light beams, where the light intensity is high compared to other regions. The focused and reflected light beams are projected by the imaging optics for road illumination. This means that the outgoing light beams are illuminating the road.

The condenser optics, the reflective shield and the imaging optics are arranged such that the reflective shield can generate a sharp cut-off line, wherein the reflected light beams contribute to an intensity hotspot. The subset of focused light beams, which impacts the reflective shield, is not lost, but can be used for road illumination, too. This can save power consumption and contributes to the safety of the road users. The road can be illuminated brightly and oncoming drivers are not blinded.

The reflective shield can comprise a plastic material which has a metallic coating. The reflective shield can also comprise a metal, e.g. aluminum or the like. The condenser optics and the imaging optics comprise a material which is transparent for light. Here and in the following "transparent" refers to a transparency of at least 80% or at least 90%. For example, the condenser optics and the imaging optics comprise glass. In another embodiment the condenser optics and the imaging optics comprise a plastic material such as polycarbonate (PC), polymethylmethacrylat (PMMA), silicone or epoxy. Thus, the condenser optics and the imaging optics can be fabricated by a molding technique like injection molding. Their fabrication can therefore by cost-effective.

Each imaging lens of the imaging lens matrix may have a diameter of less than 5 mm. The depth of the imaging lens matrix can be less than 15 mm. Thus, the imaging lens matrix can be very compact. Advantageously, the size of the imaging lens matrix is small compared to conventional systems using one single imaging lens.

In an embodiment, the at least one reflective shield is arranged between the condenser optics and the imaging optics, such that the main plane of extension of the condenser optics is generally parallel to the main plane of extension of the imaging optics, and the main plane of extension of the reflective shield is generally perpendicular or traverse with respect to the main plane of extension of the imaging optics.

The condenser lens matrix and the imaging lens matrix may be arranged such that their main planes of extension are perpendicular or approximately perpendicular to the surface of the road. The at least one reflective shield may be attached to the condenser optics such that in a vertical direction, the reflective shield is arranged under a respective row of the condenser lens matrix. The vertical direction refers to a direction which runs perpendicular to the main plane of extension of the reflective shield. In case that the condenser lens matrix comprises more than one row, further reflective shields can be arranged under each of said rows.

By such arrangement, a sharp cut-off line can be created, wherein the reflected light beams contribute to an intensity hotspot. Thus, the subset of focused light beams, which impacts the reflective shield, can also be used for road illumination.

In an embodiment, the condenser lens matrix comprises a plurality of condenser lenses. The condenser lenses are arranged in rows and/or columns. For example, the condenser lens matrix is a 3×5 matrix which comprises three rows a five columns of condenser lenses. Each of the condenser lenses may focus incoming light beams in a different focal point or on a different focal line.

In an embodiment, the imaging lens matrix comprises a plurality of imaging lenses. The imaging lenses are arranged in rows and/or columns. For example, the imaging lens matrix is a 3×5 matrix which comprises three rows a five columns of imaging lenses. The number of rows of the imaging lens matrix may be equal to the number of rows of the condenser lens matrix. Each of the imaging lenses projects a subset of the focused and reflected light beams in front of the headlamp for road illumination. This means that each imaging lens is provided to generate an image. The images are at least partially superimposed such that the desired light distribution is generated.

In an embodiment, each of the imaging lenses is assigned to one of the condenser lenses, such that respective channels of light beams within the optical system are formed. This means that each imaging lens projects at least partially that subset of light beams, which is focused by the respective condenser lens to which the imaging lens is assigned. Each imaging lens can be assigned to its own condenser lens and vice versa. However, it is also possible that several imaging lenses are assigned to the same condenser lens or that several condenser lenses are assigned to the same imaging lens. The imaging lenses of a particular row of the imaging lens matrix can be assigned to the condenser lenses of a corresponding row of the condenser lens matrix.

Light beams emanating from a condenser lens, which reach one respective imaging lens, are forming one channel of light beams. Different channels of light beams do not or only slightly interfere with each other. Thus, light beams can be optically controlled in an efficient way.

According to another aspect of the disclosure, there is an offset in the vertical direction between the imaging lens and a respective condenser lens to which the imaging lens is assigned.

This means that the vertical positions of the mass centers of the imaging lens and the corresponding condenser lens may be different. Due to this arrangement it is possible that only a first subset of the focused light beams reach the imaging optics for further projecting. A second subset of light beams, which would be projected beyond/above the cut-off line, are prevented to reach the imaging optics. However, the condenser lens can also be designed such that most of the focused light beams are directed to the imaging lens optics.

In another embodiment, the optical system further comprises at least one absorbing shield arranged between the condenser optics and the imaging optics. The at least one absorbing shield is provided to prevent crosstalk between the channels of light beams.

The at least one absorbing shield may comprise an opaque material. In other words, the absorbing shield does not transmit light. For example, the at least one absorbing shield comprises an opaque plastic material. The at least one absorbing shield may be attached on the reflective shield at a first side, and on the imaging optics at a second side by an adhesive. The first side of the absorbing shield may be attached on a rear side of the reflective shield being arranged between two respective rows of the condenser lens matrix. The second side of the absorbing shield may be attached on the imaging optics between two corresponding rows of the imaging lens matrix.

The at least one absorbing shield may prevent crosstalk between focused light beams of different rows of the condenser lens matrix. Light beams, that are focused by condenser lenses in a lower row of the condenser lens matrix and/or that are reflected by a respective lower reflective shield, are prevented to reach light beam channels of an upper row and vice versa. This additionally ensures that only those light beams are projected by one of the imaging lenses, which are focused by the respective condenser lens that is assigned to said imaging lens. In other words, the at least one absorbing shield optically separates respective rows of light beam channels corresponding to the rows of the condenser lens matrix and imaging lens matrix, respectively. Further absorbing shields may optically separate further rows from each other. Therefore, light beams can be further optically controlled by means of the at least one absorbing shield. Moreover, the absorbing shield can also act as an alignment structure to vertically align the condenser optics with the imaging optics.

In some embodiments, a focal plane of the condenser optics at least approximately matches a focal plane of the imaging optics. This means that the condenser optics focusses the incoming light beams onto the focal plane of the imaging optics.

Each of the condenser lenses within the condenser lens matrix may have its own focal point or focal line respectively. However, the focal points and/or focal lines form a common focal plane. Accordingly, the focal points of the imaging lenses within the imaging lens matrix form a common focal plane, which generally matches the focal plane of the condenser optics. This ensures that a sharp image of a used light source is projected in front of the headlamp and that a main field of illumination is uniformly bright.

As mentioned above, the condenser lens matrix may comprise a plurality of condenser lenses. In some embodiments, at least one condenser lens of the condenser lens matrix is formed as an axially symmetrical lens, such that a main surface of the respective condenser lens approximates a spherical, elliptical or parabolic surface. For example, each of the condenser lenses within the condenser lens matrix forms an axially symmetrical lens. Advantageously, almost any conventional lens design can be used to fabricate such condenser lens matrix. The main surface is a surface of the condenser lens where light beams are refracted. The main surface may face the imaging optics.

Alternatively or additionally to such embodiments, at least one condenser lens of the condenser lens matrix is formed as a segment of an axially symmetrical lens such that a main surface of the respective condenser lens approximates a slice from a spherical, elliptical or parabolic surface. For example, each of the condenser lenses within the condenser lens matrix forms a segment of an axially symmetrical lens. In a cross-section, such segment can be formed like a segment of a Fresnel lens. This means, for example, that only half of an axially symmetrical lens is used. By this design, light beams can be directed along a main direction. By way of example, incoming light beams are focused in a downward direction. This helps to ensure that all incoming light beams can be used for road illumination.

Alternatively or additionally to the above-mentioned embodiments, at least one condenser lens of the condenser lens matrix is formed as an astigmatic lens, in particular a cylinder lens or a segment of a cylinder lens. For example, the condenser lens matrix is formed by rows of condenser lenses, wherein at least one row forms a segment of a cylinder lens. In that case, imaging lenses of a respective row of the imaging lens matrix are assigned to the same condenser lens. Such design is useful to provide a wide field of illumination.

In a further alternative or in addition to the above-mentioned embodiments, at least one condenser lens of the condenser lens matrix comprises a main surface that is formed as a free-form surface. This means that the main surface can comprise bumps, grooves and/or dents. Advantageously, the main surface of the condenser lenses can be adapted to fulfil the specification of the road illumination.

In some embodiments, the condenser optics is configured such that its focal plane is between the imaging optics and an edge of the at least one reflective shield facing the imaging optics. The focal plane may be closer to said edge.

The edge of the reflective shield may mainly be formed by a straight line. The focal plane of the condenser optics may be in the vicinity of the reflective shield's edge facing the imaging optics. The closer the reflective shield's edge comes to the focal plane of the condenser optics, the more near axis light rays are reflected, such that the cut-off line is closer to the road. This arrangements can be used to achieve low beam functionality of the headlamp. In contrast, the further away the reflective shield is from the focal plane, the higher the cut-off line is. Such arrangements can be used to achieve high beam functionality of the headlamp.

In some embodiments, the optical system comprises a plurality of reflective shields as described above. This means that all features disclosed for the at least one reflective shield are also disclosed for each reflective shield comprised by the plurality of reflective shields. In particular, each of the reflective shields is provided to create the cut-off line of outgoing light beams. The cut-off line is created by superimposing the images of the reflective shields by means of the imaging optics. Moreover, the reflective shields are provided to reflect at least a subset of the focused light beams such that the reflected light beams contribute to an intensity hotspot on the side of the cut-off line facing the road.

As mentioned above, the reflective shields can be arranged parallel to each other. The reflective shields may be attached to the condenser optics such that in the vertical direction the reflective shields are arranged under respective rows of the condenser lens matrix. Thus, each reflective shield may be assigned to a respective row of the condenser lens matrix. In other words, the same reflective shield is assigned to several condenser lenses within one row of the condenser lens matrix.

Respective edges of different reflective shields facing the imaging optics may have different distances to the focal plane of the condenser optics. Thus, both low beam and high beam functionality can be implemented by the same optical system, or by different modules of the optical system.

In some embodiments, at least one of the plurality of reflective shields comprises a kink at the edge facing the imaging optics. By way of example, the kink comprises a recess, cutout or a gap in the reflective shield at said edge. This can mean that the kink penetrates the reflective shield from its main surface to its rear side. However, that the kink comprises a protrusion or elevation is likewise possible. The reflective shield may comprise more than one kink. Each kink may be assigned to one of the channels of light beams.

Due to the kink, a portion of the reflective shield is further away from the focal plane of the condenser optics. As described above, this affects the light distribution of outgoing light beams: At regions, where the kink, e.g. a recess/cutout, is present in the reflective shield, rays are not reflected. Instead, these rays are projected by the imaging optics above the cut-off line. This makes it possible to adjust the light distribution in individual regions. It can be advantageous, for example, to illuminate the right-hand side of the road in such a way that road signs are easier to see. The right-hand side of the road can therefore be illuminated above the cut-off line. The left-hand side of the road, however, needs to be illuminated so that oncoming drivers are not dazzled. Here, light beams may not be projected above the cut-off line.

According to another aspect of the disclosure, the optical system further comprises collimating optics for providing collimated incoming light beams. In an embodiment, the collimating optics comprises a light source. In an embodiment, the collimating optics further comprises a collimator lens. The collimator lens is arranged between the light source and the condenser lens matrix. The condenser lens matrix is arranged between the collimator lens and the imaging lens matrix.

The light source may be any conventional light source. For example, a light emitting diode (LED) or an array of light emitting diodes can be used as light source. Other light sources are likewise possible. The collimator lens may comprise a transparent material like glass or plastic. In case that a plastic material is used, the collimator lens can advantageously be formed by a molding technique, for example, injection molding. Thus, the fabrication costs are low. In general, a collimator lens narrows a light beam, such that the directions of propagation become more aligned in a specific direction. For example, the collimator lens aims to create parallel rays.

In some embodiments, the collimator lens is integrated in the condenser optics. The collimator lens is arranged on a rear side of the condenser optics facing the light source. The condenser lens matrix is arranged on a front side of the condenser optics facing the imaging optics. This means that the collimator lens and the condenser lens matrix are formed by one piece of the optical system. In particular, the collimator lens and condenser lens matrix comprise the same material, e.g. a plastic material. Both the collimator lens and the condenser lens matrix can be formed in the same step of the fabrication process, which further decreases the production costs.

In some embodiments, the imaging lenses of the imaging lens matrix are separated by a mesh of additional absorbing shields. The mesh of additional absorbing shields is provided to prevent crosstalk between the outgoing light beams. This means that between two neighboring imaging lenses within the imaging lens matrix there is an additional absorbing shield. The absorbing shield comprises an opaque material, e.g. a plastic material.

For example, the mesh of additional absorbing shields is fabricated by injection molding to form a holder. Then, individual imaging lenses are inserted into the mesh in order to form the imaging lens matrix. In this case, the imaging lenses and the mesh of additional absorbing shields are separated pieces, which are assembled.

Alternatively, the imaging lens matrix is formed by a single transparent substrate, which is molded into the desired shape, such that the plurality of imaging lenses is formed. Then, the mesh is generated by over-molding the substrate with an opaque material. In that case, the imaging lens matrix and the mesh are forming one piece of the optical system. In this approach, the fabrication costs are comparably low.

BRIEF DESCRIPTION OF THE DRAWINGS

The following description of Figures may further illustrate and explain aspects of the optical system. Components and parts of the optical system that are functionally identical or have an identical effect are denoted by identical reference symbols. Identical or effectively identical components and parts might be described only with respect to the Figures where they occur first. Their description is not necessarily repeated in successive Figures.

DETAILED DESCRIPTION

Figure 1:
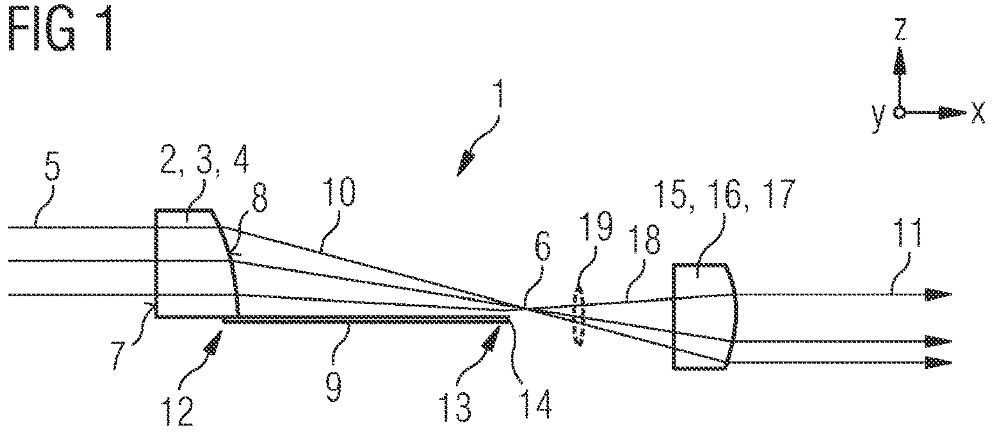
FIG. 1 shows an example of an optical system.

FIG. 1 shows an example of an optical system 1 in a cross-section. The optical system 1 can be used in a headlamp of a motor vehicle. The optical system 1 according to FIG. 1 comprises condenser optics 2 being formed by a condenser lens matrix 3. In this case, the condenser lens matrix 3 comprises one condenser lens 4. The condenser optics is provided to focus incoming light beams 5. The condenser optics 2 is provided to focus the incoming light beams 5 in a focal point 6 of the condenser optics 2. The incoming light beams are collimated, i.e. parallel to each other. The condenser optics 2 comprises a rear side 7 facing the incoming light beams 5. The condenser optics further comprises a main surface 8, which faces the focal point 6 and where the incoming light beams 5 are refracted. In the example of FIG. 1 the condenser lens 4 is formed as a segment of an axially symmetrical lens such that the main surface of the condenser lens approximates a slice from a spherical, elliptical or parabolic surface.

The optical system 1 according to FIG. 1 further comprises a reflective shield 9. A main plane of extension of the reflective shield 9 is generally perpendicular to a main plane of extension of the condenser lens matrix 2. In a vertical direction z, the reflective shield is arranged under the condenser lens 4. The vertical direction z refers to a direction which is perpendicular to the main plane of extension of the reflective shield 9.

The reflective shield 9 is provided to reflect at least a subset of focused light beams 10. The focused light beams 10 which are reflected at the reflective shield 9 are called reflected light beams 18. The reflective shield 9 is further provided to create a cut-off line 33 (not shown) of outgoing light beams 11. The cut-off line 33 refers to a line above which in the vertical direction z no or relatively few outgoing light beams 11 are projected for illuminating the road. The subset of focused light beams 10, that is reflected, comprises in particular focused light beams 10 which are near the optical axis of the condenser lens 4.

The reflective shield 9 is attached to the condenser optics 2 at a first side 12 below the condenser lens 4. At a second side 13 opposite to the first side 12 the reflective shield 9 comprises an edge 14, which faces the focal point 6 of the condenser lens 4. The edge 14 may be close to the focal point 6.

The optical system 1 further comprises imaging optics 15 being formed by an imaging lens matrix 16. In this case, the imaging lens matrix 16 comprises one imaging lens 17. A main plane of extension of the imaging optics 15 is generally parallel to the main plane of extension of the condenser optics 2. In the direction x of light propagation, the reflective shield 9 is arranged between the condenser optics 2 and the imaging optics 15. In the vertical direction z, there is an offset between the imaging lens 17 and the condenser lens 4. This means that a mass center of the imaging lens 17 is arranged below a mass center of the condenser lens 4.

The imaging lens 17 has a focal point 6 which at least approximately matches the focal point 6 of the condenser lens 4. Therefore, the condenser optics 2 focusses the incoming light beams 5 onto a focal plane of the imaging optics 15. The focal point 6 is located between the imaging optics 15 and the edge 14 of the reflective shield 9 facing the imaging optics 15. In FIG. 1, the imaging lens 17 is assigned to the condenser lens 4, forming a respective channel of light beams 19 within the optical system 1.

The imaging optics 15 is provided to project the focused light beams 10 and the reflected light beams 18 in front of the headlamp such that the reflected light beams 18 contribute to an intensity hotspot 34 (not shown) on one side of the cut-off line 33. The side of the cut-off line 33, where the intensity hotspot 34 is created, faces the road. In other words, in the vertical direction z the intensity hotspot 34 is below the cut-off line 33. The outgoing light beams 11 may mainly be parallel.

The optical system 1 according to FIG. 1 may be understood as one channel of a module 20 of an optical system 1, as shown in the following Figures. This means that further channels can be combined. The channels can be arranged next to each other in a lateral direction y or the vertical direction z. Moreover, several modules 20 can be combined such that an overall optical system 1 is formed. Correspondingly, the features described in context of FIG. 1 showing an optical system 1 comprising only one channel may also apply to the embodiments according to the following Figures comprising several channels.

Figure 2:
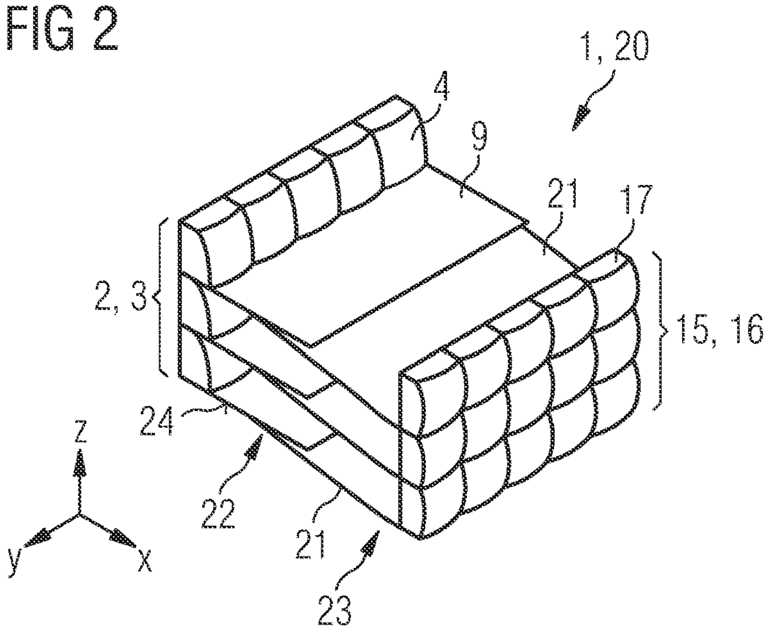
FIG. 2 shows another example of an optical system.

In FIG. 2 another example of an optical system 1 is shown in a perspective view. The embodiment of FIG. 2 can be seen as combination of several channels according to FIG. 1, such that a module 20 of an optical system 1 is formed.

In this case the condenser lens matrix 2 comprises a plurality of condenser lenses 4, namely fifteen condenser lenses 4, which are arranged in three rows and five columns, respectively. The condenser optics 2 including the condenser lenses 4 may be formed by one single substrate comprising a transparent material. For example, glass or plastic can be used. The condenser optics 2 is fabricated by injection molding, for example. The number of rows and/or columns shown in FIG. 2 is merely arbitrary. As such, the condenser lens matrix 3 can comprises a different number of rows and/or columns. The condenser lenses 4 within the condenser lens matrix 3 may focus incoming light beams 5 in different focal points 6 (not shown). However, the focal points may be located on a common plane, also called focal plane.

In the vertical direction z a respective reflective shield 9 is arranged under each row of the condenser lens matrix 3. Thus, the embodiment of FIG. 2 comprises three reflective shields. The reflective shields 9 are arranged parallel to each other.

The imaging optics 15 is formed by the imaging lens matrix 16, which in this case comprises fifteen imaging lenses 17 arranged in three rows a five columns. Thus, in this example, each of the imaging lenses 17 is assigned to one of the condenser lenses 4. The module 20 of FIG. 2 therefore forms fifteen channels of light beams 19. In particular, each of the imaging lenses 17 of a particular row of the imaging lens matrix 16 is assigned to a respective condenser lens 4 of a corresponding row of the condenser lens matrix 3. In other words, the module 20 of FIG. 2 comprises three rows of light beam channels 19.

Each of the imaging lenses 17 projects the focused and reflected light beams 10, 18 in front of the headlamp, forming outgoing light beams 11, as shown in FIG. 1. This means that each imaging lens 17 contributes to the road illumination by projecting an image. Said images are superimposed at least partially. A sharp cut-off line 33 (not shown) is generated as a superimposed image of the reflective shields 9. Moreover, as the reflective light beams 18 are also projected by the imaging optics 15, they are not lost, but are used for road illumination, too. In particular, they contribute to the intensity hotspot 34 (not shown) directly below the cut-off line 33, i.e. on the side of the cut-off line 33 which faces the road.

The embodiment of FIG. 2 further comprises three absorbing shields 21. Each of the absorbing shields 21 is arranged between the condenser optics 2 and the imaging optics 15 in the direction x of light propagation. The absorbing shields 21 are provided to prevent crosstalk between the channels of light beams 19. In particular, they are provided to prevent crosstalk between light beams channels 19 of different rows of the module 20.

The absorbing shields 21 may comprise an opaque material. As shown in FIG. 2, each absorbing shield 21 is mounted on a respective reflective shield 9 at a first side 22, and on the imaging optics 15 at a second side 23. The first side 22 of the absorbing shield 21 is mounted on a rear side 24 of the reflective shield 9. The rear side 24 of the reflective shield 9 is opposite to a main surface of the reflective shield, where the light beams are reflected. The second side 23 of the absorbing shield 21 is mounted on the imaging optics 15 between two corresponding rows of the imaging lens matrix 16. The absorbing shields 21 are generally parallel to each other. A main plane of extension of each of the absorbing shields 21 is inclined with respect to the main plane of extension of the reflective shields 9.

Figure 3:
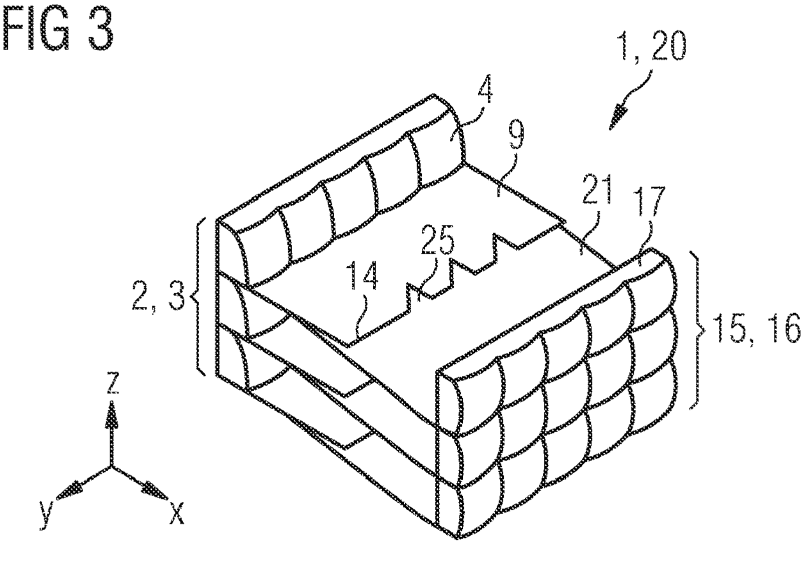
FIG. 3 shows another example of an optical system.

In FIG. 3 another example of an optical system 1 is shown in a perspective view. The embodiment according to FIG. 3 is different from the embodiment of FIG. 2 in that it shows several kinks 25 in the topmost reflective shield 9. The kinks are formed by recesses/cutouts at the edge 14 facing the imaging optics 15. Each kink 25 is assigned to one of the light beam channels 19. The exact number, position and shape of the kinks 25 shown in FIG. 3 is merely exemplary and depends on the desired light distribution of outgoing light beams 11. In the example of FIG. 3 the cutouts have a triangular shape, but different shapes are likewise possible. Rays crossing the cutout in the reflective shield are not reflected. Instead, these rays are projected by the imaging optics above the cut-off line 33 (not shown). This makes it possible to adjust the light distribution in individual regions. For example, the right-hand side of the road can be illuminated in such a way that road signs are easier to see.

It should be mentioned, that the modules 20 shown in FIG. 2 and FIG. 3 can be combined. For example, the modules 20 can be arranged next to each other in the lateral direction y or on top of each other in the vertical direction z.

Additionally, the optical system 1 can comprises further modules 20, wherein the distance of the reflective shield's edge 14 to the focal plane can vary from one module 20 to another. Moreover, each module 20 can comprise its own light source (not shown) or the modules can comprise a common light source. By turning on or off the light source of the respective module 20, the light distribution of outgoing light beams 11 can be adjusted according to the requirements of the road illumination. For example, an optical system 1 comprising such modules 20 can enable both low and high beam functionality.

Figure 4A:
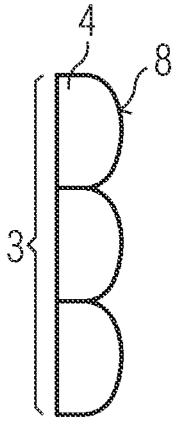
FIGS. 4*a-c* show examples of a condenser lens matrix of an optical system.
Figure 4B:
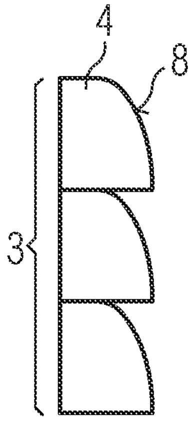
Figure 4C:
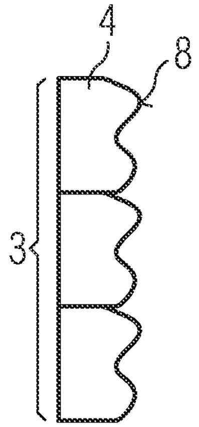

FIGS. 4*a* to 4*c* show examples of condenser lenses 4 within the condenser lens matrix 3 in a cross-section. In FIG. 4*a* three rows of condenser lenses 4 are shown, wherein each condenser lens 4 is formed as an axially symmetrical lens, such that the main surface 8 of the respective condenser lens 4 approximates a spherical, elliptical or parabolic surface.

In FIG. 4*b* three rows of condenser lenses 4 are shown, wherein each condenser lens 4 is formed as a segment of an axially symmetrical lens such that the main surface 8 of the respective condenser lens 4 approximates a slice from a spherical, elliptical or parabolic surface. In particular, the condenser lenses 4 are formed by half of an axially symmetrical lens. Such condenser lenses 4 have been shown also in FIGS. 1 to 3.

In FIG. 4*c* three rows of condenser lenses 4 are shown, wherein the main surface 8 of the respective condenser lens 4 is formed as a free-form surface.

Figure 4D:
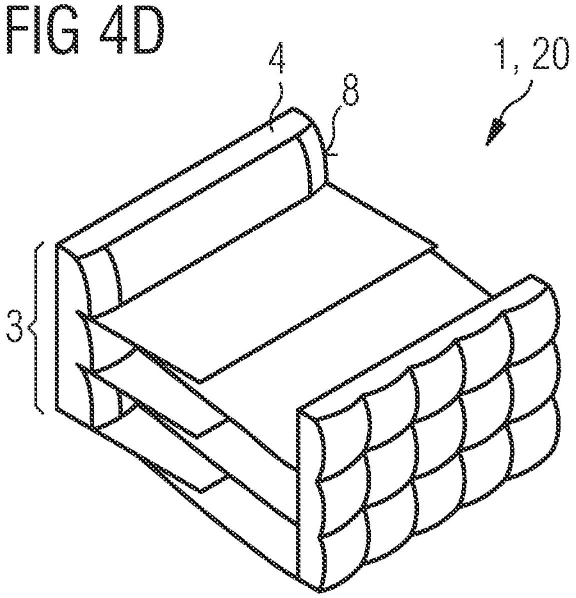
FIG. 4*d* shows another example of a condenser lens matrix in an optical system.

FIG. 4*d* shows an optical system with another example of a condenser lens matrix. In that example, the condenser lenses 4 of the condenser lens matrix 3 are formed as astigmatic lenses, in particular as segments of a cylinder lens. This means that the condenser lens matrix 3 is formed by rows of condenser lenses 4, wherein at least one row forms a segment of a cylinder lens. In that case, imaging lenses 17 of a respective row of the imaging lens matrix 16 are assigned to the same condenser lens 4.

It should be mentioned that the condenser optics 2 can comprise different kinds of condenser lenses 4 (as shown in FIGS. 4*a-d*) in the same condenser lens matrix 3. It is also possible, that the optical system 1 comprises several modules wherein the condenser lenses 4 of different modules are differently shaped. For example, a module 20 comprising condenser lenses 4 formed as cylinder lenses as shown in FIG. 4*d* is suitable to provide a wide field of illumination.

Figure 5A:
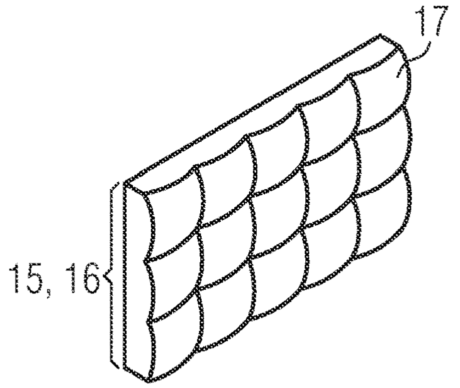
FIGS. 5*a-b* show examples of an imaging lens matrix of an optical system.

FIG. 5*a* shows an example of the imaging optics 15 formed by the imaging lens matrix 16 in a perspective view. As the condenser lens matrix 3, the imaging lens matrix 16 may be formed by one single substrate comprising a transparent material. For example, glass or plastic can be used. The imaging optics 15 is fabricated by injection molding, for example. The number of rows and/or columns shown in FIG. 5*a* is merely arbitrary. As such, the imaging lens matrix 16 can comprise a different number of rows and/or columns, i.e. the number of imaging lenses 17 is arbitrary.

Figure 5B:
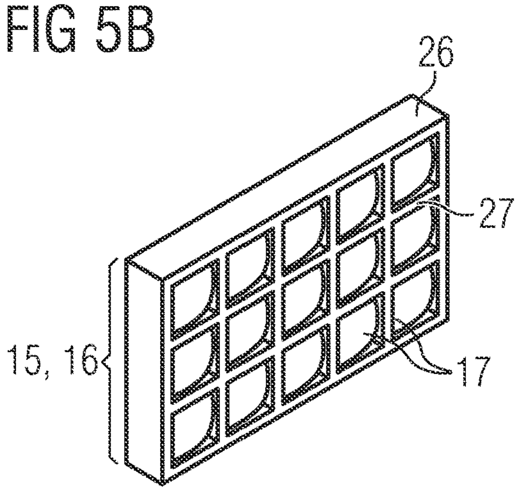

FIG. 5*b* shows another example of the imaging optics 15 in a perspective view. In this example, the imaging lenses 17 of the imaging lens matrix 16 are separated by a mesh 26 of additional absorbing shields 17. The mesh 26 of additional absorbing shields 27 is provided to prevent crosstalk between the outgoing light beams 11 (not shown). This means that between two neighboring imaging lenses 17 within the imaging lens matrix 16 there is an additional absorbing shield 27. The absorbing shield comprises an opaque material, e.g. a plastic material.

For example, the mesh 26 of additional absorbing shields 27 is fabricated by injection molding to form a holder. Then, individual imaging lenses 16 are inserted into the mesh 26 in order to form the imaging lens matrix 16. In this case, the imaging lenses 17 and the mesh 26 of additional absorbing shields 27 are separated pieces, which are assembled.

Alternatively, the imaging lens matrix 16 is formed by a single transparent substrate, which is molded into the desired shape, such that the plurality of imaging lenses 17 is formed. Then, the mesh 26 is generated by over-molding the substrate with an opaque material. In that case, the imaging lens matrix 16 and the mesh 26 are forming one piece of the optical system 1.

Figure 6A:
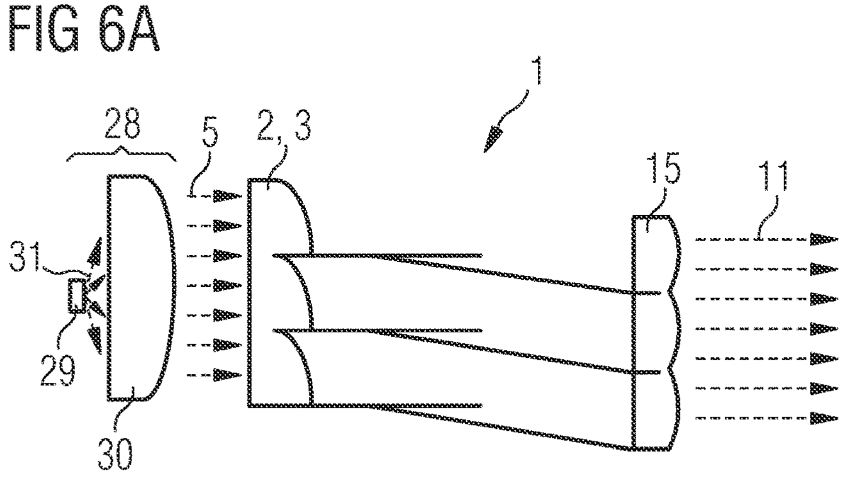
FIGS. 6*a-b* show examples of an optical system comprising collimating optics.

In FIG. 6*a* an optical system 1 that comprises collimating optics 28 is shown in a cross-section. The collimating optics 28 provides collimated incoming light beams 5. The collimating optics 28 comprises the light source 29 and a collimator lens 30. The collimator lens 30 is arranged between the light source 29 and the condenser optics 2 comprising the condenser lens matrix 3. The condenser lens matrix 3 is arranged between the collimator lens 30 and the imaging optics 15.

As shown in FIG. 6*a*, the light source can emit light in a wide range of directions. In other words, emitted light beams 31 are highly divergent. The collimator lens 30 redirects the emitted light beams 31, such that approximately parallel incoming light beams 5 are created. The collimator lens 30 may comprise a plastic material. The collimator lens 30 can be formed by injection molding, for example. In the example of FIG. 6*a* the collimator lens 30 forms a separate piece of the optical system 1.

Figure 6B:
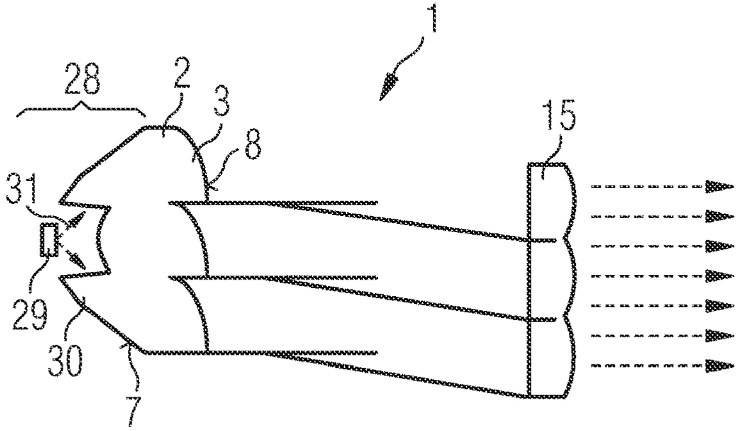

However, the collimator lens 30 can also be integrated in the condenser optics 2, as shown in FIG. 6*b*. The collimator lens is arranged on the rear side 7 of the condenser optics 2 facing the light source 29. The condenser lens matrix 3 is arranged on the main surface 8 of the condenser optics 2 facing the imaging optics 15. This means that the collimator lens 30 and the condenser lens matrix 3 are formed by one piece of the optical system 1. In particular, the collimator lens 30 and condenser lens matrix 3 comprise the same material, e.g. a plastic material. Both the collimator lens 30 and the condenser lens matrix 3 can be formed in the same step of the fabrication process.

The collimator lens 30 may redirect the emitted light beams 31 by means of refraction and/or by means of total internal reflection (TIR). TIR occurs when light in one medium reaches the boundary with another medium at a sufficiently slanting angle, provided that the second ("external") medium is transparent to the waves and allows them to travel faster than in the first ("internal") medium. The angle of incidence at said boundary must exceed a certain value, called critical angle of total reflection. Light then no longer enters the second medium (in this case the ambient air) but is almost completely reflected in the first medium (the collimator lens). Therefore, in order for TIR to occur, the refractive index of the collimator lens may be larger than the refractive index of surrounding air. The inclination of at least some surfaces of the collimator lens with respect the light propagation may be such that the angle of incidence exceeds the critical angle. In the example of FIG. 6*b*, the center part of the collimator lens 30 redirects the emitted light beams 31 by means of light beam refraction, while the outer parts of the collimator lens 30 redirect the emitted light beams 31 by means of TIR.

Figure 7A:
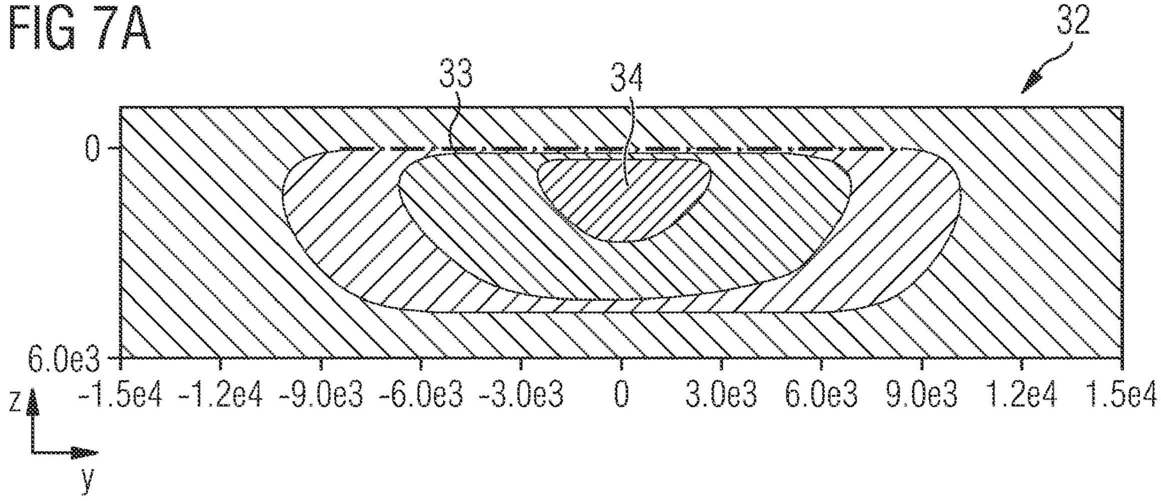
FIGS. 7*a-c* show examples of light distributions of an optical system.

FIG. 7*a* shows a mapping of the light intensity 32 of outgoing light beams 11 of an optical system 1 according to FIG. 2 or FIG. 4. The light intensity 32 is determined by simulation results and is shown on a rectangular detector screen at a distance from the optical system 1. The light intensity 32 is shown as a function of the position on the screen in the lateral direction y and the vertical direction z. However, the scaling of the y-axis and the z-axis is rather arbitrary.

The light distribution is symmetrical in relation to the lateral position at $y=0$. Moreover, it can be seen that there is a sharp light/dark boundary, also called cut-off line 33, at the vertical position at $z=0$, which is marked by a dashed line. The light intensity has a maximum below the cut-off line 33, i.e. for values $z<0$. The light intensity 32 rapidly decreases for values $z>0$. The maximum of the light intensity 32 is also called hotspot 34.

Figure 7B:
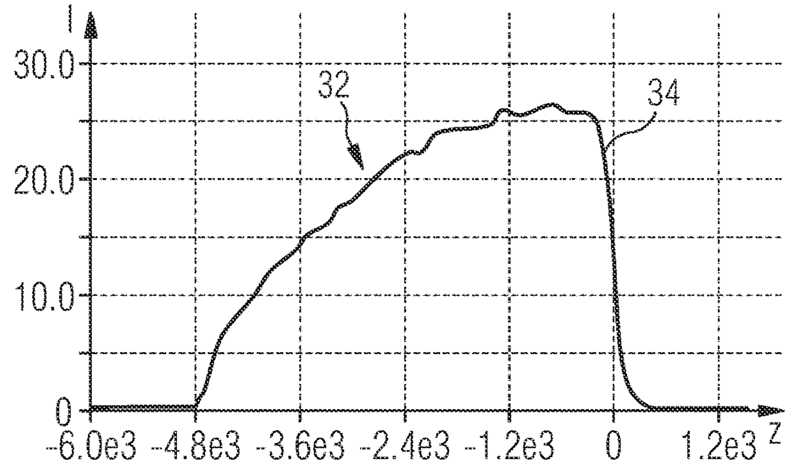

In FIG. 7*b* a graph is shown representing the light intensity 32 at the lateral position $y=0$ as a function of the vertical position z according to FIG. 7*a*. The linear scaling of the z-axis is rather arbitrary, as is the linear scaling of the intensity axis (I-axis). It can be seen the intensity raises up to the maximum, i.e. the hotspot 34, below the vertical position at $z=0$. The light intensity 32 rapidly decreases for values $z>0$, thus creating the cut-off line. The distribution of the light intensity 32 can be designed according to the requested illumination of the road.

Figure 7C:
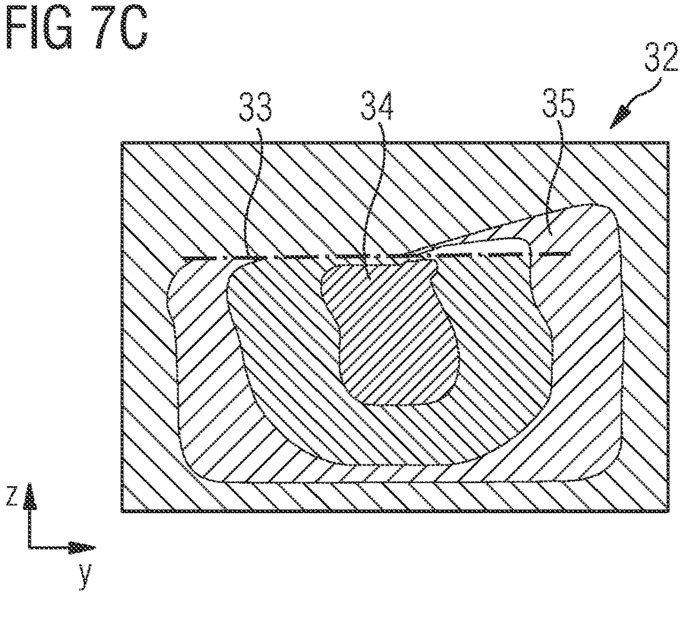

FIG. 7*c* shows another mapping of the light intensity 32 of outgoing light beams 11 of the optical system 1 according to FIG. 3. As in FIG. 7*a*, the light intensity 32 is determined by simulation results and is shown on a rectangular detector screen at a distance from the optical system 1. In the example of FIG. 7*c* the light distribution is not axially symmetrical. Instead, on the right-hand side light beams 11 are projected above the cut-off line 33. There is therefore a region 35 above the cut-off line 33 in which the intensity value is not vanishing. As described above, this light distribution can be caused by one or more kinks in at least one reflective shield 9 of the optical system 1 (see FIG. 3). This light distribution makes it easier to see road signs on the right-hand side of the road, for example.

The embodiments of the optical system disclosed herein have been discussed for the purpose of familiarizing the reader with novel aspects of the idea. Although preferred embodiments have been shown and described, many changes, modifications, equivalents and substitutions of the disclosed concepts may be made by one having skill in the art without unnecessarily departing from the scope of the claims.

It will be appreciated that the disclosure is not limited to the disclosed embodiments and to what has been particularly shown and described hereinabove. Rather, features recited in separate dependent claims or in the description may advantageously be combined. Furthermore, the scope of the disclosure includes those variations and modifications, which will be apparent to those skilled in the art and fall within the scope of the appended claims.

The term “comprising”, insofar it was used in the claims or in the description, does not exclude other elements or steps of a corresponding feature or procedure. In case that the terms “a” or “an” were used in conjunction with features, they do not exclude a plurality of such features. Moreover, any reference signs in the claims should not be construed as limiting the scope.

The invention claimed is:

1. An optical system for use in a headlamp of a motor vehicle, comprising:

condenser optics formed by a condenser lens matrix and being provided to focus incoming light beams;

a plurality of reflective shields being provided to reflect at least a subset of the focused light beams and to create a cut-off line of outgoing light beams; and imaging optics formed by an imaging lens matrix and being provided to project the focused light beams and the reflected light beams in front of the headlamp such that the reflected light beams contribute to an intensity hotspot on one side of the cut-off line, wherein at least one of the plurality of reflective shields comprises a kink at an edge facing the imaging optics.

2. The optical system according to claim 1, wherein the at least one reflective shield is arranged between the condenser optics and the imaging optics, such that a main plane of extension of the condenser optics is generally parallel to a main plane of extension of the imaging optics, and a main plane of extension of the reflective shield is generally perpendicular or traverse with respect to the main plane of extension of the imaging optics.

3. The optical system according to claim 1, wherein the condenser lens matrix comprises a plurality of condenser lenses, and wherein the imaging lens matrix comprises a plurality of imaging lenses, each of the imaging lenses being assigned to one of the condenser lenses, forming respective channels of light beams within the optical system.

4. The optical system according to claim 3, wherein in a vertical direction there is an offset between the imaging lens and a respective condenser lens to which the imaging lens is assigned, where the vertical direction (z) runs perpendicular to the main plane of extension of the at least one reflective shield.

5. The optical system according to 3, further comprising at least one absorbing shield arranged between the condenser optics and the imaging optics, the at least one absorbing shield being provided to prevent crosstalk between the channels of light beams.

6. The optical system according to claim 3, wherein the kink is assigned to one of the respective channels of light beams.

7. The optical system according to claim 1, wherein a focal plane of the condenser optics at least approximately matches a focal plane of the imaging optics such that the condenser optics focusses the incoming light beams onto the focal plane of the imaging optics.

8. The optical system according to claim 1, wherein the condenser lens matrix comprises a plurality of condenser lenses, and wherein at least one condenser lens of the condenser lens matrix is formed as an axially symmetrical lens, such that a main surface of the respective condenser lens approximates a spherical, elliptical or parabolic surface.

9. The optical system according to claim 1, wherein the condenser lens matrix comprises a plurality of condenser lenses, and wherein at least one condenser lens of the condenser lens matrix is formed as a segment of an axially symmetrical lens such that the main surface of the respective condenser lens approximates a slice from a spherical, elliptical or parabolic surface.

10. The optical system according to claim 1, wherein the condenser lens matrix comprises a plurality of condenser lenses, and wherein at least one condenser lens of the condenser lens matrix is formed as an astigmatic lens, in particular a cylinder lens, or such that the main surface of the respective condenser lens is formed as a free-form surface.

11. The optical system according to claim 1, wherein the condenser optics is configured such that its focal plane is between the imaging optics and an edge of the at least one reflective shield facing the imaging optics, but closer to said edge.

12. The optical system according to claim 1, further comprising collimating optics for providing collimated incoming light beams, the collimating optics comprising a light source and a collimator lens, wherein the collimator lens is arranged between the light source and the condenser lens matrix, and the condenser lens matrix is arranged between the collimator lens and the imaging lens matrix.

13. The optical system according to claim 12, wherein the collimator lens is integrated in the condenser optics, such that the collimator lens is arranged on a rear side of the condenser optics facing the light source and the condenser lens matrix is arranged on a main surface of the condenser optics facing the imaging optics.

14. The optical system according to claim 1, wherein the imaging lenses of the imaging lens matrix are separated by a mesh of additional absorbing shields, the mesh being provided to prevent crosstalk between the outgoing light beams.

15. The optical system according to claim 1, wherein the kink comprise a recess, cutout, a gap, a protrusion, or an elevation in one of the at least one of the plurality of reflective shields at the edge facing the imaging optics.

16. The optical system according to claim 1, wherein the kink penetrates one of the at least one of the plurality of reflective shields from a main surface to a rear surface of the one of the at least one of the plurality of reflective shields.

17. The optical system according to claim 1, wherein the kink is arranged to allow a portion of one of at least one of the plurality of reflective shields to be further away from a focal plane of the condenser optics to change a light distribution of outgoing light beams.

* * * * *